US012607290B2

(12) United States Patent      (10) Patent No.:   US 12,607,290 B2

Roarty et al.      (45) Date of Patent:    Apr. 21, 2026

(54) MONITOR STAND WITH FOLDING MOUNTING BRACKETS

(71) Applicant: Bloomberg Finance L.P., New York, NY (US)

(72) Inventors: Sean Roarty, New York, NY (US); Masamichi Udagawa, New York, NY (US); Sigrid G. Moeslinger, New York, NY (US)

(73) Assignee: Bloomberg Finance L.P., New York, NY (US)

( * ) Notice: Subject to any disclaimer, the term of this patent is extended or adjusted under 35 U.S.C. 154(b) by 39 days.

(21) Appl. No.: 18/437,273

(22) Filed: Feb. 9, 2024

(65) Prior Publication Data

US 2025/0257842 A1     Aug. 14, 2025

(51) Int. Cl.
     *F16M 11/04*      (2006.01)
     *F16M 11/20*      (2006.01)

(52) U.S. Cl.
     CPC ....... *F16M 11/046* (2013.01); *F16M 11/2057* (2013.01)

(58) Field of Classification Search
     CPC ........................... F16M 11/046; F16M 11/2057
     See application file for complete search history.

(56) References Cited

U.S. PATENT DOCUMENTS 5,687,939 A * 11/1997 Moscovitch ........... F16M 11/24
                                     361/679.04
5,904,328 A * 5/1999 Leveridge .............. F16M 11/10
                                       248/922

RE36,978 E * 12/2000 Moscovitch ....... F16M 11/2021
                                     248/921
6,343,006 B1 * 1/2002 Moscovitch ........ B60R 11/0235
                                     361/679.04
6,554,238 B1 * 4/2003 Hibberd ............... F16M 11/041
                                     248/278.1
D496,362 S     9/2004 Ozolins et al.
D496,363 S     9/2004 Ozolins et al.
D507,270 S     7/2005 Ozolins et al.
D507,570 S     7/2005 Ozolins et al.
7,331,551 B2 * 2/2008 Oddsen, Jr. ............ F16M 11/24
                                     361/679.55
7,444,716 B2 * 11/2008 Hsu .................... F16M 11/2021
                                     16/337

(Continued)

FOREIGN PATENT DOCUMENTS

KR      20210040860 A * 4/2021      ............. F16M 11/22

OTHER PUBLICATIONS

Ex parte Quayle Office Action mailed Apr. 24, 2025, in connection with Design U.S. Appl. No. 29/928,235, filed Feb. 9, 2024, 11 pgs.

(Continued)

*Primary Examiner* — Eret C Mcnichols

(74) *Attorney, Agent, or Firm* — Chiesa Shahinian & Giantomasi PC

(57)          ABSTRACT

A monitor stand with folding mounting brackets is provided. The monitor stand comprises a first mounting bracket for coupling to a first monitor and a second mounting bracket for coupling to a second monitor. A first arm of the monitor stand is coupled to the first mounting bracket via a first hinge and a second arm of the monitor stand is coupled to the second mounting bracket via a second hinge.

16 Claims, 9 Drawing Sheets

(56)  References Cited

U.S. PATENT DOCUMENTS

| | | | |
|---|---|---|---|
| 7,529,083 B2 * | 5/2009 | Jeong | F16M 11/105 |
| | | | 600/407 |
| 7,607,620 B2 * | 10/2009 | Ozolins | F16M 11/2021 |
| | | | 248/922 |
| 7,636,133 B1 * | 12/2009 | Hsu | F16M 13/00 |
| | | | 348/794 |
| 7,764,491 B2 * | 7/2010 | Zhao | F16M 11/2014 |
| | | | 361/679.22 |
| 7,780,125 B2 * | 8/2010 | Yen | F16M 11/10 |
| | | | 248/920 |
| RE42,091 E * | 2/2011 | Moscovitch | F16M 11/08 |
| | | | 361/679.04 |
| 7,922,133 B2 * | 4/2011 | Hsu | F16M 13/00 |
| | | | 248/133 |
| 7,975,975 B2 * | 7/2011 | Lee | F16M 11/046 |
| | | | 248/176.1 |
| 7,995,332 B2 * | 8/2011 | Ozolins | F16M 11/2014 |
| | | | 361/679.06 |
| 8,000,090 B2 * | 8/2011 | Moscovitch | F16M 11/105 |
| | | | 361/679.04 |
| D649,552 S | 11/2011 | Huang | |
| 8,047,487 B2 * | 11/2011 | Hwang | F16M 11/105 |
| | | | 248/370 |
| 8,083,193 B2 * | 12/2011 | Matsui | F16M 11/041 |
| | | | 248/222.51 |
| D660,308 S | 5/2012 | Huang | |
| 8,405,959 B2 * | 3/2013 | Lee | F16M 11/046 |
| | | | 361/679.01 |
| 8,534,615 B2 * | 9/2013 | Huang | F16M 11/045 |
| | | | 361/679.02 |
| 9,042,092 B2 * | 5/2015 | Lu | F16M 11/041 |
| | | | 361/679.29 |
| 9,266,243 B2 * | 2/2016 | Swartz | F16M 13/022 |
| 9,441,782 B2 * | 9/2016 | Funk | F16M 13/00 |
| 9,591,778 B1 * | 3/2017 | Mercier | F16M 13/00 |
| D787,237 S | 5/2017 | Bowman et al. | |
| D791,776 S | 7/2017 | Monsalve | |
| D805,523 S | 12/2017 | Bowman et al. | |
| 9,958,108 B2 | 5/2018 | Bowman et al. | |
| D824,918 S | 8/2018 | Roarty et al. | |
| D853,404 S | 7/2019 | Bowman et al. | |
| D854,861 S | 7/2019 | Lee et al. | |
| 10,344,911 B2 * | 7/2019 | Mills | F16M 11/041 |
| 10,436,378 B2 | 10/2019 | Roarty et al. | |
| D877,745 S | 3/2020 | Knapp et al. | |
| 10,638,620 B2 * | 4/2020 | Huang | G06F 1/1601 |
| D895,635 S | 9/2020 | Sitoh et al. | |
| D905,700 S | 12/2020 | Lu et al. | |
| D947,858 S | 4/2022 | Zhang | |
| D1,003,905 S | 11/2023 | Lee et al. | |
| D1,033,441 S | 7/2024 | Leman et al. | |
| 2004/0011938 A1 | 1/2004 | Oddsen | |
| 2004/0041062 A1 | 3/2004 | Ozolins et al. | |
| 2007/0008686 A1 * | 1/2007 | Jang | F16M 11/105 |
| | | | 248/371 |
| 2007/0097609 A1 | 5/2007 | Moscovitch | |
| 2007/0195495 A1 * | 8/2007 | Kim | F16M 11/105 |
| | | | 248/920 |
| 2008/0055832 A1 | 3/2008 | Ozolins et al. | |
| 2008/0117578 A1 | 5/2008 | Moscovitch | |
| 2008/0232044 A1 | 9/2008 | Moscovitch | |
| 2009/0134285 A1 * | 5/2009 | Huang | F16M 11/2014 |
| | | | 248/124.1 |
| 2009/0315837 A1 * | 12/2009 | Geiger | G06F 3/0414 |
| | | | 345/173 |
| 2014/0366674 A1 * | 12/2014 | Swartz | F16M 13/022 |
| | | | 901/27 |
| 2015/0131214 A1 * | 5/2015 | Liu | G06F 1/1601 |
| | | | 361/679.01 |
| 2016/0295716 A1 * | 10/2016 | Chen | F16M 11/041 |
| 2017/0202351 A1 | 7/2017 | Bowman et al. | |

OTHER PUBLICATIONS

Notice of Allowance mailed Sep. 4, 2025, in connection with Design U.S. Appl. No. 29/928,235, filed Feb. 9, 2024, 13 pgs.

* cited by examiner

100

112-A

110-A

116-A

114-A

108-A

106

108-A

110-B

114-B

112-B

104

102

MONITOR STAND WITH FOLDING MOUNTING BRACKETS

TECHNICAL FIELD

The present invention relates generally to a monitor stand and more particularly to a monitor stand with folding mounting brackets having a reduced shipping size.

BACKGROUND OF THE INVENTION

Monitors are often mounted on monitor stands to enable the monitors to be positioned at a desired height, distance, and angle for viewing by a user. The assembly of monitors stands is a very cumbersome and time-consuming process, particularly in a business environment where potentially hundreds or thousands of users require monitors. To address this problem, manufacturers often ship monitor stands pre-assembled. However, conventional pre-assembled monitor stands are large and bulky. Thus, the shipment of such conventional pre-assembled monitor stands requires large shipping boxes, which results in high shipping costs and a large carbon footprint. As technology has advanced and monitor costs have decreased, larger monitor and multiple monitor configurations have become increasingly popular, requiring larger monitor stands and further increasing the cost and carbon footprint of shipment.

SUMMARY

In accordance with one or more embodiments, a monitor stand with folding mounting brackets is provided. The folding mounting brackets enable the shipment of the monitor stand using a relatively smaller shipping box as compared to conventional monitor stands, thus reducing the cost and carbon footprint of shipment.

In one embodiment, the monitor stand further comprises a central hinge coupled to the first arm and the second arm, a column coupled to the central hinge, and a base coupled to the column.

In one embodiment, the monitor stand comprises a first mounting bracket for coupling to a first monitor and a second mounting bracket for coupling to a second monitor. A first arm of the monitor stand is coupled to the first mounting bracket via a first hinge and a second arm of the monitor stand is coupled to the second mounting bracket via a second hinge.

In one embodiment, the first mounting bracket comprises one or more interfaces for interlocking with one or more corresponding interfaces of the first monitor and the second mounting bracket comprises one or more interfaces for interlocking with one or more corresponding interfaces of the second monitor. The first mounting bracket and the second mounting bracket each comprise opposing square faces connected by four rectangular edge faces. Each of the four rectangular edge faces comprise at least one of the one or more interfaces.

In one embodiment, one of the four rectangular edge faces of the first mounting bracket comprises a first notch disposed between protruding portions. The first notch is configured to fit an interlocking portion of the first arm. One of the four rectangular edge faces of the second mounting bracket comprises a second notch disposed between protruding portions. The second notch configured to fit an interlocking portion of the second arm.

In one embodiment, the first mounting bracket is coupled to the first arm by a first pin extending at least in part through the interlocking portion of the first arm and the protruding portions of the first mounting bracket to form the first hinge and the second mounting bracket is coupled to the second arm by a second pin extending at least in part through the interlocking portion of the second arm and the protruding portions of the second mounting bracket to form the second hinge.

In one embodiment, the first arm and the second arm are in a horizontal configuration and the first mounting bracket and the second mounting bracket are respectively externally rotated via the first hinge and the second hinge to an unfolded position for mounting the first monitor and the second monitor in a side-by-side configuration.

In one embodiment, the first arm and the second arm are in a vertical configuration and the first mounting bracket and the second mounting bracket are respectively internally rotated via the first hinge and the second hinge to a folded position for mounting the first monitor and the second monitor in a top-bottom configuration.

In accordance with one or more embodiments, a monitor stand with folding mounting brackets is provided. The monitor stand comprises a first mounting bracket coupled to a first monitor and a second mounting bracket coupled to a second monitor. A first arm of the monitor stand is coupled to the first mounting bracket via a first hinge and a second arm of the monitor stand is coupled to the second mounting bracket via a second hinge.

In accordance with one or more embodiments, a mounting bracket of a monitor stand is provided. The mounting bracket comprises opposing faces connected by four edge faces. The opposing faces may be opposing square faces and the edge faces may be rectangular edge faces. A notch is disposed between protruding portions in one of the edge faces. The notch is configured to fit an interlocking portion of an arm of the monitor stand. A pin extends at least in part through the interlocking portion and the protruding portions to form a hinge.

In one embodiment, the mounting bracket further comprises one or more interfaces disposed in each of the edge faces for interlocking with one or more corresponding interfaces of a monitor.

In one embodiment, the arm is coupled to a central hinge, the central hinge is coupled to a column, and the column is coupled to a base.

These and other advantages of the invention will be apparent to those of ordinary skill in the art by reference to the following detailed description and the accompanying drawings.

DETAILED DESCRIPTION

Figure 1:
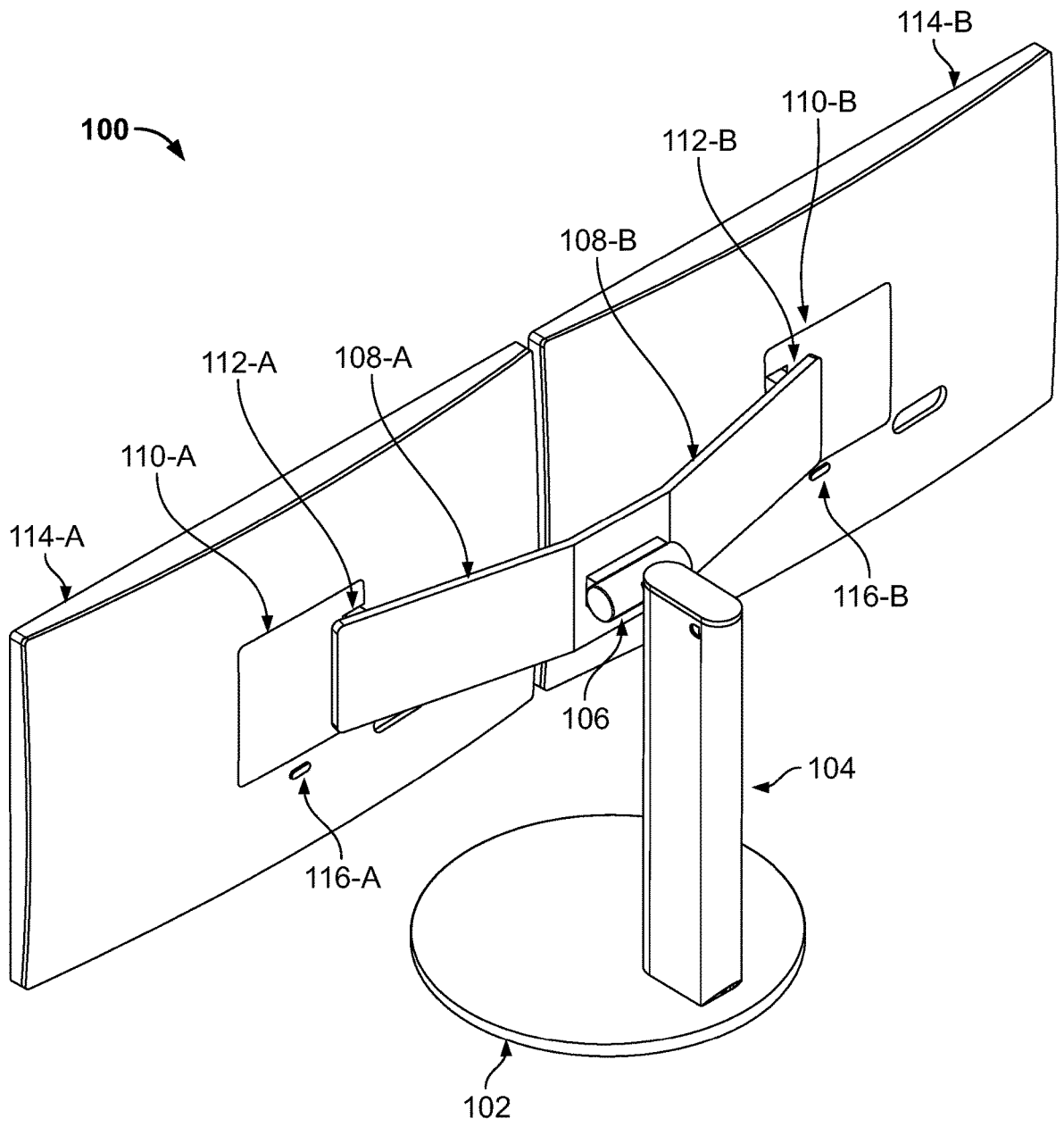
FIG. 1 shows a monitor stand having monitors mounted thereon, the monitor stand having monitor arms in a horizontal configuration and mounting brackets in an unfolded state, in accordance with one or more embodiments.

Embodiments described herein generally relate to a monitor stand with folding mounting brackets. The folding mounting brackets enable the shipment of the monitor stand using a smaller shipping box as compared to conventional monitor stands, and thus reducing the cost and carbon footprint of shipment. Further, the monitors mounted on the folding mounting brackets maintain the same distance between each other regardless of whether the monitor stand is in a horizontal configuration or a vertical configuration. Embodiments described herein will be described with reference to the drawings, in which like reference numerals represent the same or similar elements.

Figure 2:
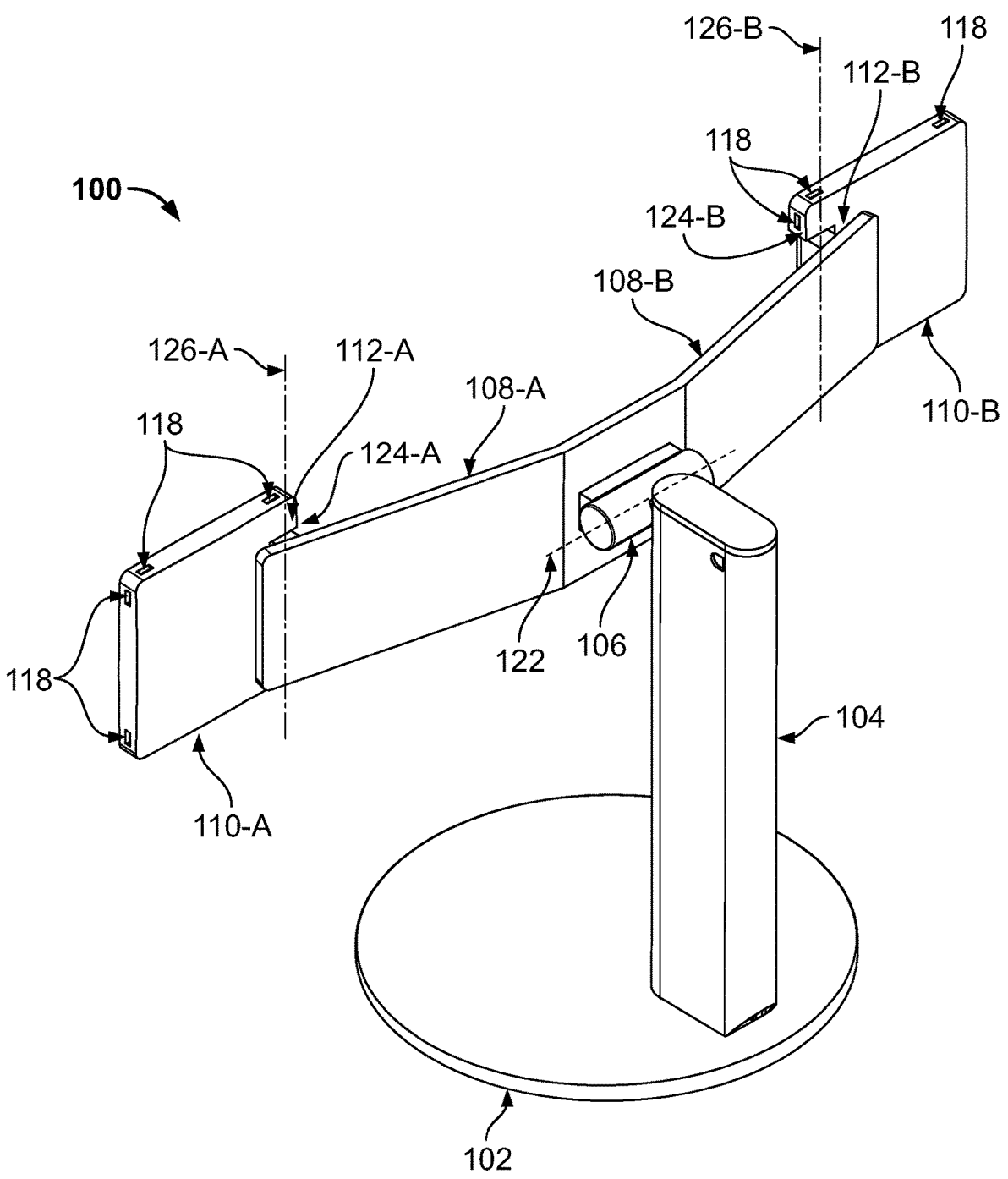
FIG. 2 shows a monitor stand without monitors mounted thereon, the monitor stand having monitor arms in a horizontal configuration and mounting brackets in an unfolded state, in accordance with one or more embodiments.

FIGS. 1 and 2 show a monitor stand 100 having monitor arms 108-A and 108-B (collectively referred to as monitor arms 108) in a horizontal configuration and mounting brackets 110-A and 110-B (collectively referred to as mounting brackets 110) in an unfolded state, in accordance with one or more embodiments. FIG. 1 shows monitor stand 100 having monitors 114-A and 114-B (collectively referred to as monitors 114) mounted thereon. FIG. 2 shows monitor stand 100 without monitors 114 mounted thereon. Monitors 114 may be any display device for displaying content, such as, e.g., text, images, video, etc. Examples of monitors 114 include computer monitors, televisions, or any other suitable display device.

As shown in FIGS. 1 and 2, monitors 114 are respectively mounted to monitor arms 108 via mounting brackets 110. Monitor arms 108 are in a horizontal configuration for mounting monitors 114 in a side-by-side configuration. While monitor stand 100 is shown in FIGS. 1 and 2 as having two monitor arms 108 for supporting two monitors 114, it should be understood that monitor stand 100 may have any number of monitor arms 108 for supporting any number of monitors 114. Monitor arms 108 are coupled to central tilt hinge 106 for rotating monitors 114 about longitudinal axis 122 (shown in FIG. 2). Central tilt hinge 106 is coupled to column 104, which is shown as a vertical column in FIGS. 1 and 2. However, column 104 may comprise any arm coupled to central tilt hinge 105 for supporting arms 108. Column 104 is coupled to base 102 for supporting the load of monitors 114. In the embodiments shown in FIGS. 1 and 2, base 102 is a desktop base configured to sit on top of a desk or other surface. However, it should be understood that base 102 may be any other suitable base for supporting monitors 114, such as, e.g., a clamp, a grommet, a wall mount, etc.

Figure 5:
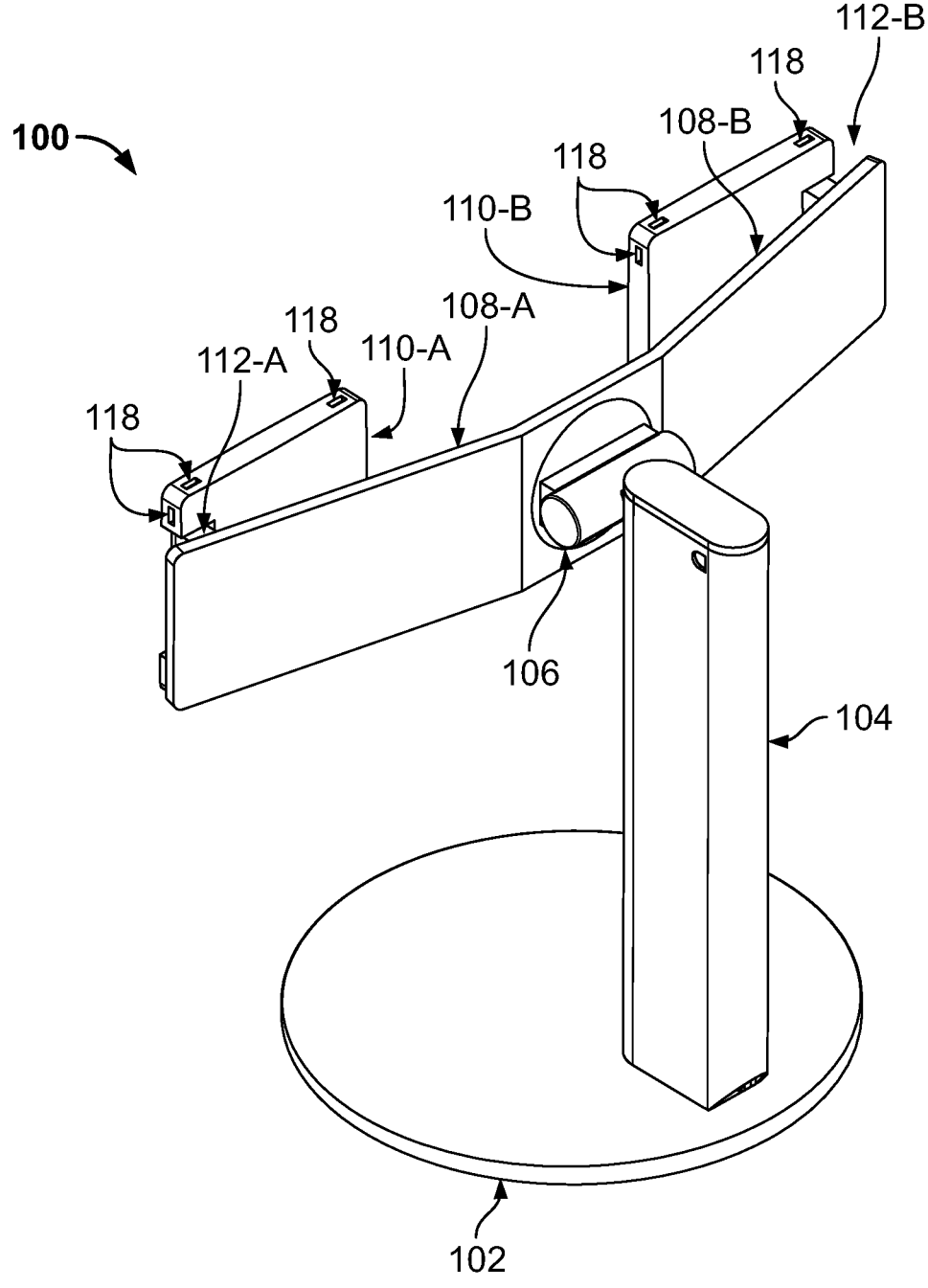
FIG. 5 shows a monitor stand in a folded state with monitor arms in a horizontal configuration, in accordance with one or more embodiments.
Figure 6:
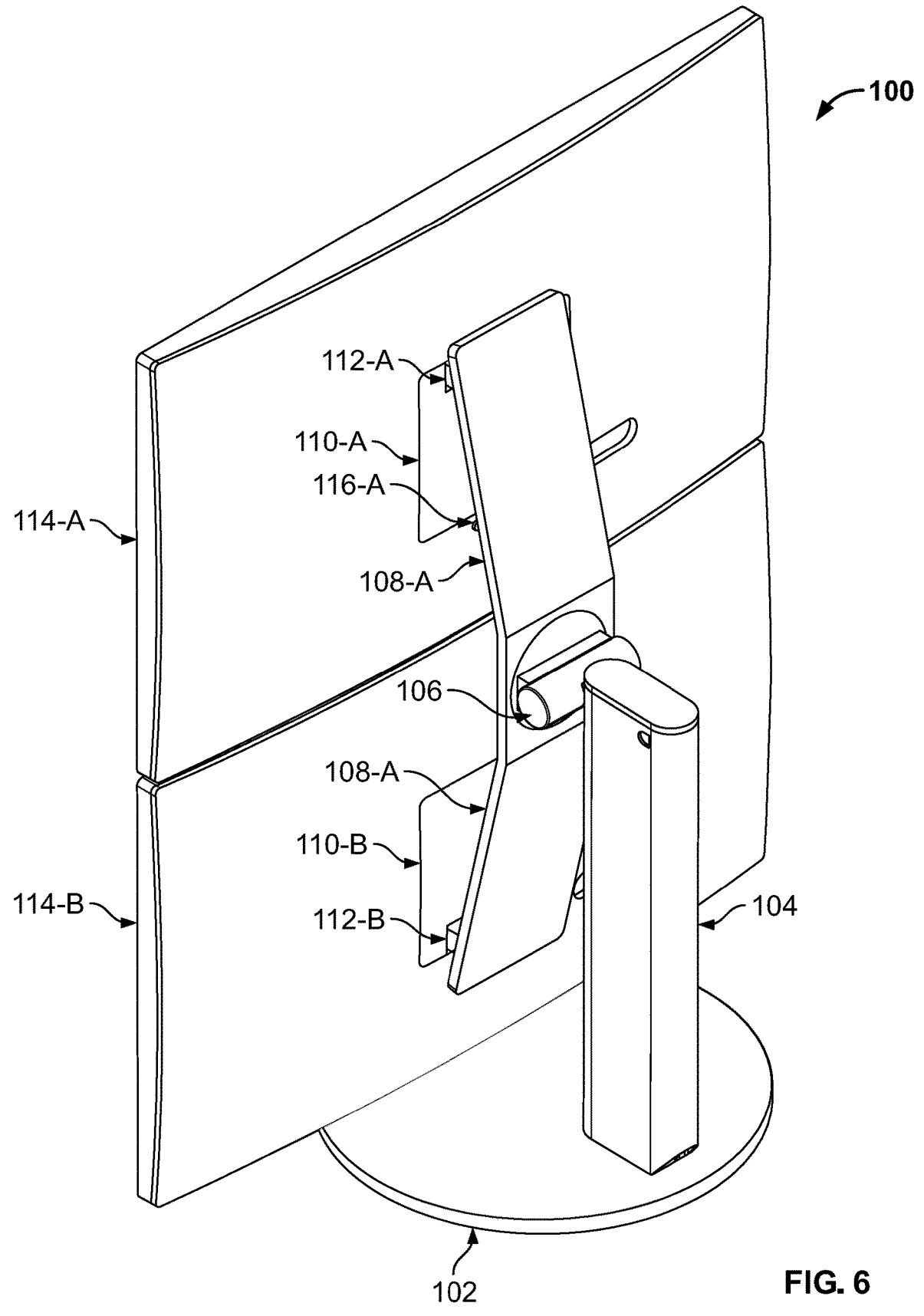
FIG. 6 shows a monitor stand having monitors mounted thereon, the monitor stand having monitor arms in a vertical configuration and mounting brackets in a folded state, in accordance with one or more embodiments.
Figure 7:
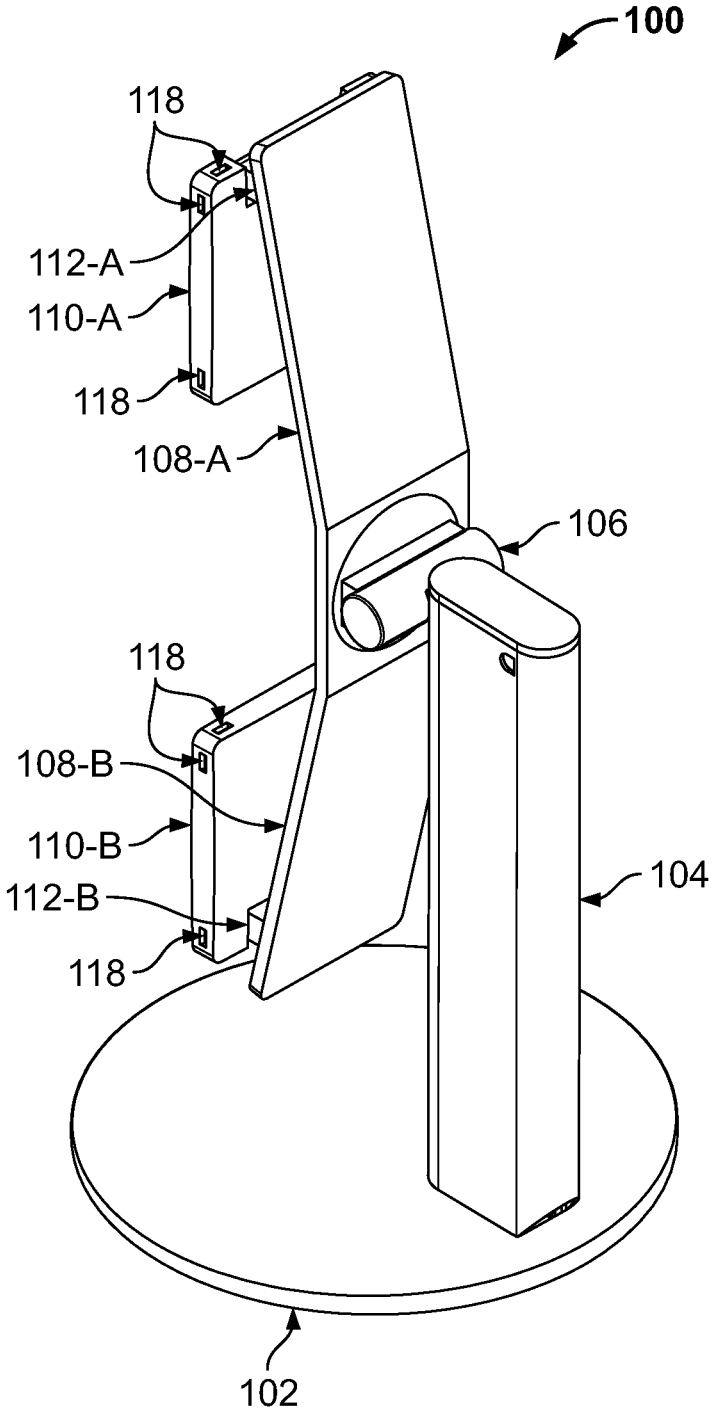
FIG. 7 shows a monitor stand having monitors mounted thereon, the monitor stand having monitor arms in a vertical configuration and mounting brackets in a folded state, in accordance with one or more embodiments.

Mounting brackets 110 are coupled to monitor arms 108 via tilt hinges 112-A and 112-B (collectively referred to as tilt hinges 112) respectively. As shown in FIG. 2, tilt hinges 112 respectively couple to mounting brackets 110 at or near edge faces 124-A and 124-B (collectively referred to as edges 124) of mounting brackets 110 to respectively enable rotation of mounting brackets 110 about single rotational axes 126-A and 126-B (collectively referred to as axes 126) of tilt hinges 112. The rotation of mounting brackets 110 enables tilt of monitors 114 about axes 126 as desired by a user for viewing monitors 114, as well as folding and unfolding mounting brackets 110 for, e.g., shipping monitor stand 100. In one embodiment, mounting brackets 110 are unfolded by externally rotating mounting brackets 110 about axes 126 such that mounting brackets 110 are rotated away from a longitudinal median plane of monitor stand 100, as shown in FIGS. 1 and 2. In another embodiment, mounting brackets 110 are folded by internally rotating mounting brackets 110 about axes 126 such that mounting brackets 110 are rotated towards a longitudinal median plane of monitor stand 100, as shown in FIGS. 5-7 which are discussed in further detail below.

Figure 3:
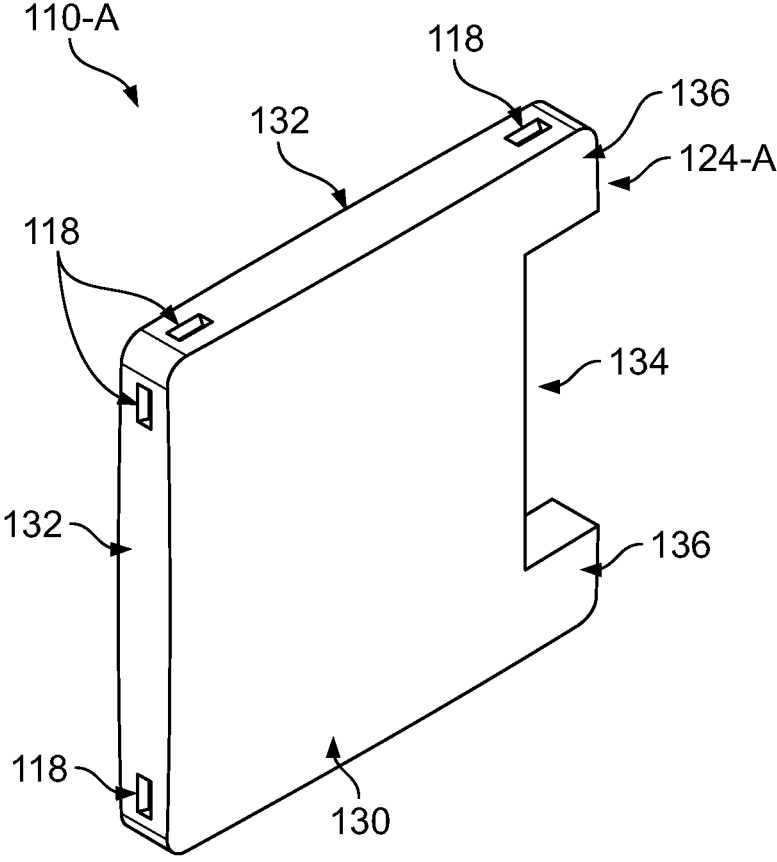
FIG. 3 shows a mounting bracket of a monitor stand, in accordance with one or more embodiments.

FIG. 3 shows mounting bracket 110-A of monitor stand 100, in accordance with one or more embodiments. It should be understood that the description of mounting bracket 110-A is equally applicable to mounting bracket 110-B. Mounting bracket 110-A is shaped substantially as a square cuboid having two opposing square faces 130 (only one face 130 is visible in FIG. 3) connected by four substantially rectangular edge faces 132 (only two edge faces 132 are visible in FIG. 3). Edge face 124-A of the edge faces 132 comprises a notch 134 disposed between protruding portions 136 of mounting bracket 110-A. An interlocking portion (not shown) of monitor arm 108-A is configured to fit into notch 134 and one or more pins (not shown) are configured to extend at least in part through the interlock portion of monitor arm 108-A and protruding portions 136 to form tilt hinge 112-A, thereby coupling mounting bracket 110-A to monitor arm 108-A.

Monitor 114-A is mounted on mounting bracket 110-A via female interfaces 118 disposed on edge faces 132 of mounting brackets 110-A. In one embodiment, for example where monitor arms 108 of monitor stand 100 are configured to rotate between a horizontal configuration (as shown in FIGS. 1, 2, and 5) and a vertical configuration (as shown in FIGS. 6 and 7), mounting bracket 110-A comprises one or more female interfaces 118 on all four edge faces 132 of mounting bracket 110-A to enable monitor 114-A to be mounted when monitor arms 108 are in the horizontal configuration and the vertical configuration. Monitor 114-A is mounted on mounting bracket 110-A as described below with respect to FIG. 4.

Figure 4:
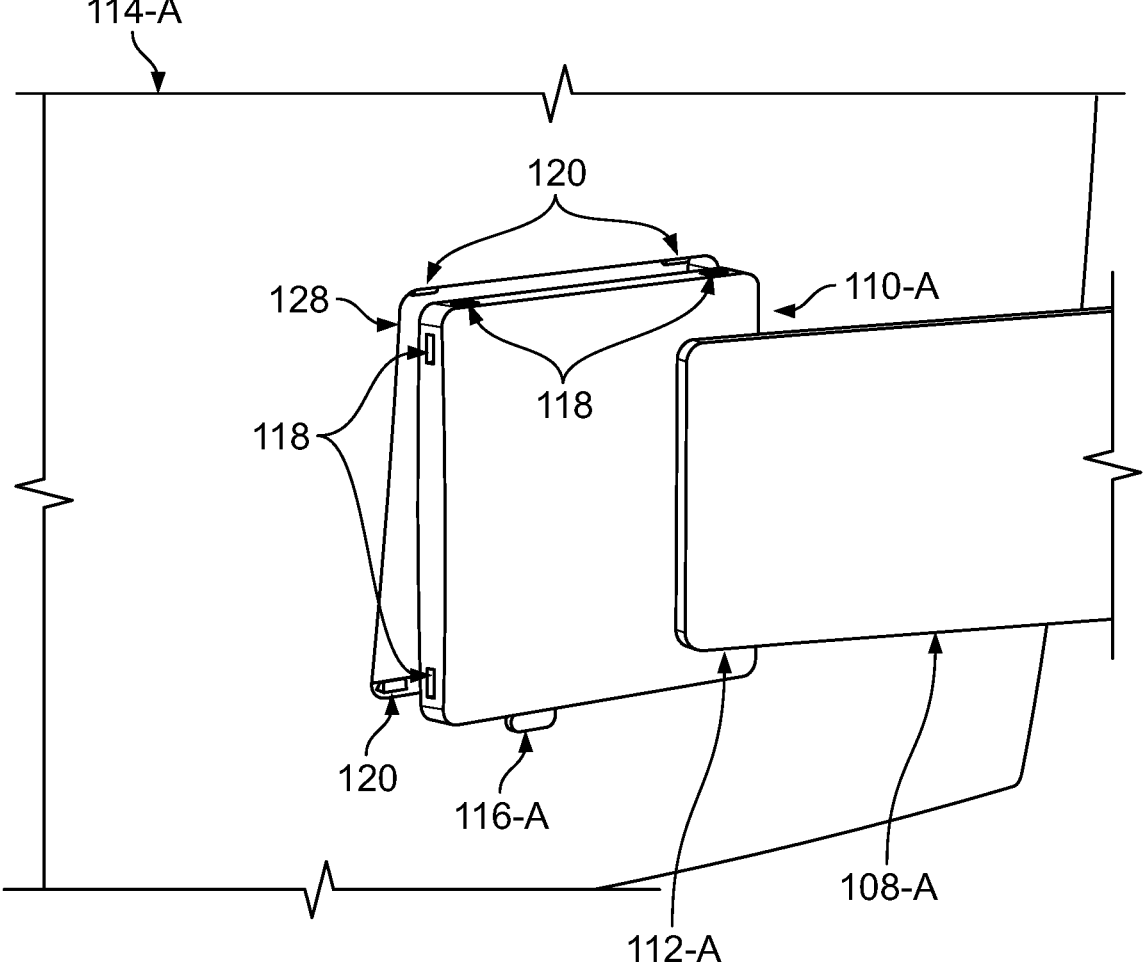
FIG. 4 shows monitor being mounted on a monitor stand via a mounting bracket, in accordance with one or more embodiments.

FIG. 4 shows monitor 114-A being mounted on monitor stand 100 via mounting bracket 110-A, in accordance with one or more embodiments. As shown in FIG. 4, monitor 114-A comprises retractable male interfaces 120 on the top and bottom of recess 128 of the rear of monitor 114-A. In operation, monitor 114-A is secured to mounting bracket 110-A for mounting on monitor stand 100 by inserting mounting bracket 110-A into recess 128, causing retractable male interfaces 120 to retract and interlock with corresponding female interfaces 118 on edge faces 132 of mounting bracket 110-A. Mounting bracket 110-A may be removed from recess 128 for unmounting from monitor stand 100 by depressing button 116-A to cause retractable male interfaces 120 to retract and removing mounting bracket 110-A from recess 128. Monitor 114-B may be secured to and removed (via button 116-B) from mounting bracket 118-B in a similar manner as described with respect to monitor 114-A and mounting bracket 110-A.

It should be understood that while female interfaces 118 and retractable male interfaces 120 are respectively described as being female interfaces and male interfaces, the present invention is not so limited. Such female interfaces may be male interfaces and vice versa. Further, such female and male interfaces may be any suitable interface for coupling mounting brackets 110 to monitors 114 and are not limited to male/female interfaces. Such female and male interfaces may be implemented in any suitable configuration (e.g., layout, shape, etc.) and is not limited to the configuration shown in the figures.

FIG. 5 shows monitor stand 100 having monitor arms 108 in a horizontal configuration and mounting brackets 110 in a folded state, in accordance with one or more embodiments. Monitor stand 100 having monitor arms 108 in a horizontal configuration and mounting brackets 110 in a folded state has relatively smaller dimensions as compared to conventional monitor stands, thereby reducing costs and the carbon footprint for shipping monitor stand 100.

FIGS. 6 and 7 show a monitor stand 100 having monitor arms 108 in a vertical configuration and mounting brackets 110 in a folded state, in accordance with one or more embodiments. FIG. 6 shows monitor stand 100 having monitors 114 mounted thereon via mounting brackets 110. FIG. 7 shows monitor stand 100 without monitors mounted thereon. Monitor arms 108 rotate 90 degrees to orient between the horizontal configuration (as shown in, e.g., FIGS. 1, 2, and 5) and the vertical configuration (as shown in, e.g., FIGS. 6 and 7). Monitor arms 108 in the vertical configuration and mounting brackets 110 in the folded state enable monitors 114 to be mounted in a top-bottom configuration. Monitor stand 100 having monitor arms 108 in a vertical configuration and mounting brackets 110 in a folded state also has relatively smaller dimensions as compared to conventional monitor stands, thereby reducing costs and the carbon footprint for shipping monitor stand 100.

Figure 8:
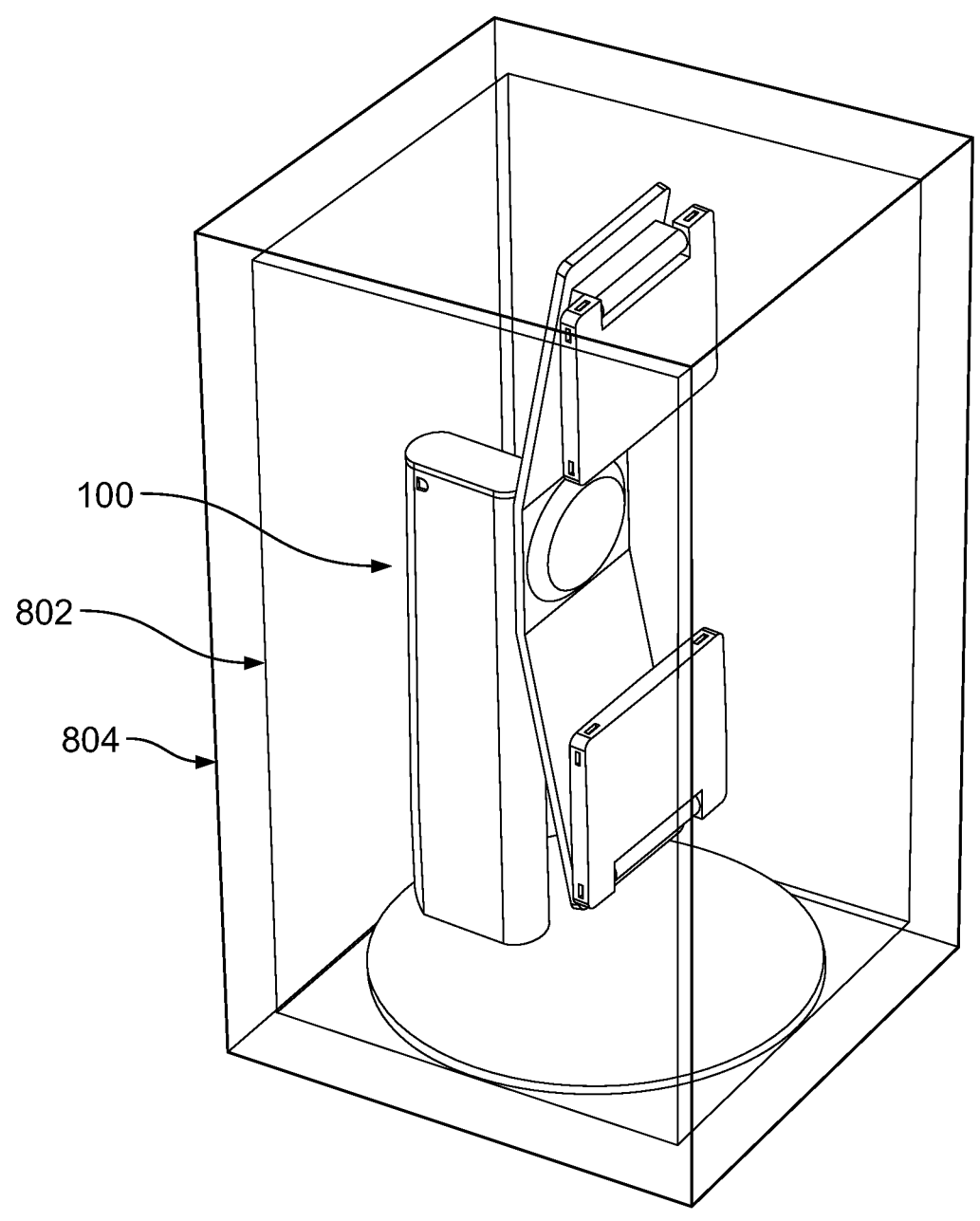
FIG. 8 shows monitor stand packaged for shipping without monitors, in accordance with one or more embodiments.

FIG. 8 shows monitor stand 100 packaged for shipping without monitors 114, in accordance with one or more embodiments. Monitor stand 100 is packaged with inner packaging 802 and outer packaging 804. As illustratively shown in FIG. 8, outer packaging 804 has dimensions of 600×350×350 mm (millimeters) (23.75×13.75×13.75 inches) for shipping monitor stand 100.

Figure 9:
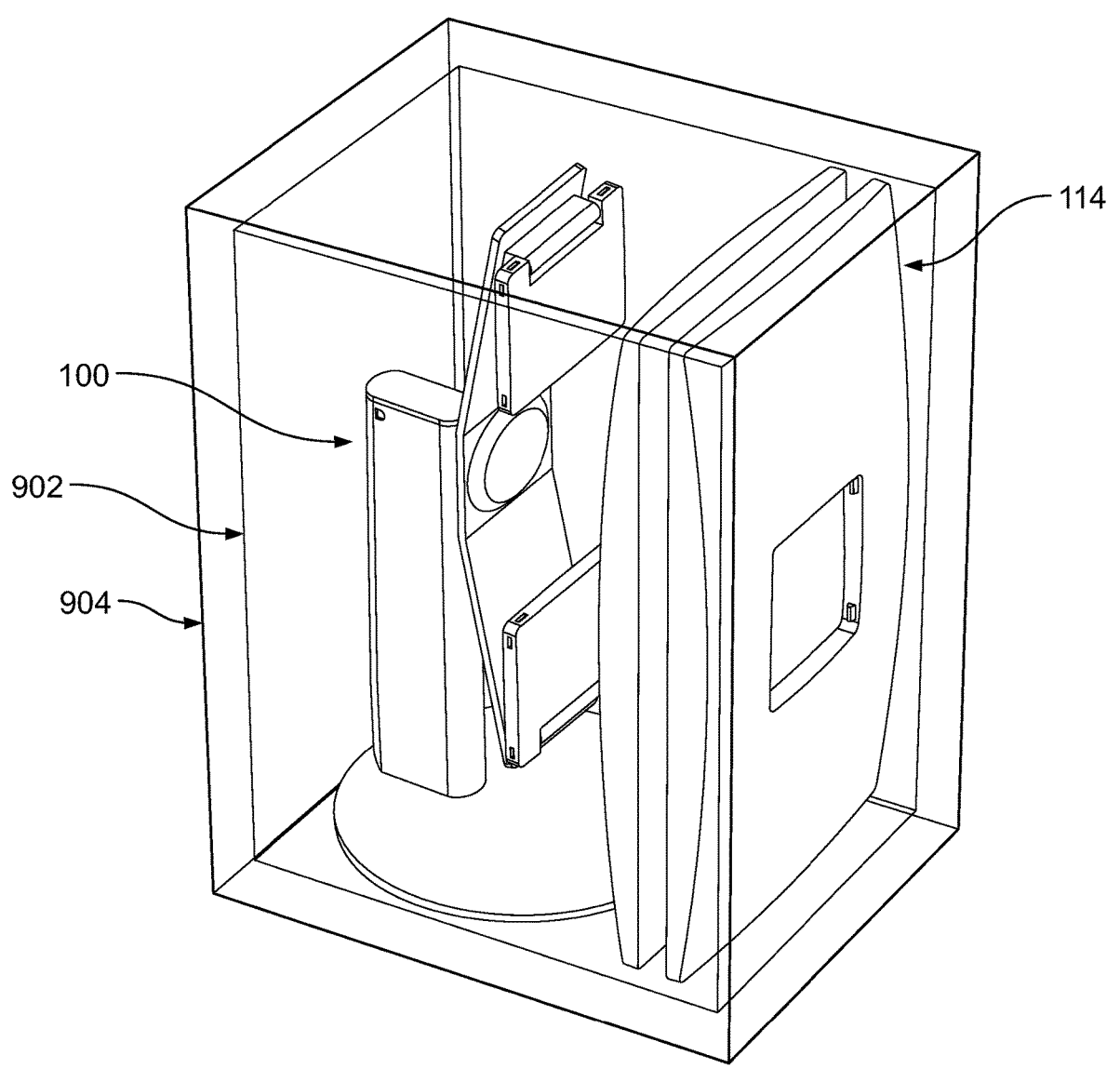
FIG. 9 shows monitor stand packaged for shipping with monitors, in accordance with one or more embodiments.

FIG. 9 shows monitor stand 100 packaged for shipping with monitors 114, in accordance with one or more embodiments. Monitor stand 100 is packaged together with monitors 114 with inner packaging 902 and outer packaging 904. As illustratively shown in FIG. 9, outer packaging 904 has dimensions of 600×370×460 mm (23.75×14.75×18.25 inches) for shipping monitor stand 100 with monitors 114.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A monitor stand comprising:
a first mounting bracket for coupling to a first monitor, the first mounting bracket comprising one or more interfaces for interlocking with one or more corresponding interfaces of the first monitor;

a second mounting bracket for coupling to a second monitor, the second mounting bracket comprising one or more interfaces for interlocking with one or more corresponding interfaces of the second monitor;
a first arm coupled to the first mounting bracket via a first hinge; and
a second arm coupled to the second mounting bracket via a second hinge,
wherein the first mounting bracket and the second mounting bracket each comprise opposing faces connected by four edge faces, each of the four edge faces of the first mounting bracket and the second mounting bracket comprising at least one of the one or more interfaces of the first mounting bracket and the second mounting bracket respectively.

2. The monitor stand of claim 1, further comprising:
a central hinge coupled to the first arm and the second arm;
a column coupled to the central hinge; and
a base coupled to the column.

3. The monitor stand of claim 1, wherein the opposing faces of the first mounting bracket and the second mounting bracket comprise opposing square faces and the four edge faces of the first mounting backet and the second mounting bracket comprise four rectangular edge faces.

4. The monitor stand of claim 3, wherein:
one of the four rectangular edge faces of the first mounting bracket comprises a first notch disposed between protruding portions, the first notch configured to fit an interlocking portion of the first arm; and
one of the four rectangular edge faces of the second mounting bracket comprises a second notch disposed between protruding portions, the second notch configured to fit an interlocking portion of the second arm.

5. The monitor stand of claim 4, wherein:
the first mounting bracket is coupled to the first arm by a first pin extending at least in part through the interlocking portion of the first arm and the protruding portions of the first mounting bracket to form the first hinge; and
the second mounting bracket is coupled to the second arm by a second pin extending at least in part through the interlocking portion of the second arm and the protruding portions of the second mounting bracket to form the second hinge.

6. The monitor stand of claim 1, wherein the first arm and the second arm are in a horizontal configuration and the first mounting bracket and the second mounting bracket are respectively externally rotated via the first hinge and the second hinge to an unfolded position for mounting the first monitor and the second monitor in a side-by-side configuration.

7. The monitor stand of claim 1, wherein the first arm and the second arm are in a vertical configuration and the first mounting bracket and the second mounting bracket are respectively internally rotated via the first hinge and the second hinge to a folded position for mounting the first monitor and the second monitor in a top-bottom configuration.

8. A monitor stand comprising:
a first mounting bracket coupled to a first monitor, the first mounting bracket comprising one or more interfaces for interlocking with one or more corresponding interfaces of the first monitor;
a second mounting bracket coupled to a second monitor, the second mounting bracket comprising one or more interfaces for interlocking with one or more corresponding interfaces of the second monitor;

a first arm coupled to the first mounting bracket via a first hinge; and a second arm coupled to the second mounting bracket via a second hinge, wherein the first mounting bracket and the second mounting bracket each comprise opposing faces connected by four edge faces, each of the four edge faces of the first mounting bracket and the second mounting bracket comprising at least one of the one or more interfaces of the first mounting bracket and the second mounting bracket respectively.

9. The monitor stand of claim 8, further comprising:

a central hinge coupled to the first arm and the second arm;

a column coupled to the central hinge; and a base coupled to the column.

10. The monitor stand of claim 8, wherein the opposing faces of the first mounting bracket and the second mounting bracket comprise opposing square faces and the four edge faces of the first mounting backet and the second mounting bracket comprise four rectangular edge faces.

11. The monitor stand of claim 10, wherein:

one of the four rectangular edge faces of the first mounting bracket comprises a first notch disposed between protruding portions, the first notch configured to fit an interlocking portion of the first arm; and one of the four rectangular edge faces of the second mounting bracket comprises a second notch disposed between protruding portions, the second notch configured to fit an interlocking portion of the second arm.

12. The monitor stand of claim 11, wherein:

the first mounting bracket is coupled to the first arm by a first pin extending at least in part through the interlocking portion of the first arm and the protruding portions of the first mounting bracket to form the first hinge; and the second mounting bracket is coupled to the second arm by a second pin extending at least in part through the interlocking portion of the second arm and the protruding portions of the second mounting bracket to form the second hinge.

13. The monitor stand of claim 8, wherein the first arm and the second arm are in a horizontal configuration and the first mounting bracket and the second mounting bracket are respectively externally rotated via the first hinge and the second hinge to an unfolded position for mounting the first monitor and the second monitor in a side-by-side configuration.

14. The monitor stand of claim 8, wherein the first arm and the second arm are in a vertical configuration and the first mounting bracket and the second mounting bracket are respectively internally rotated via the first hinge and the second hinge to a folded position for mounting the first monitor and the second monitor in a top-bottom configuration.

15. A mounting bracket for mounting a monitor on a monitor stand, the mounting bracket comprising:

opposing faces connected by four edge faces;

one or more interfaces disposed in each of the four edge faces for interlocking with one or more corresponding interfaces of the monitor;

a notch disposed between protruding portions in one of the edge faces, the notch configured to fit an interlocking portion of an arm of the monitor stand; and a pin extending at least in part through the interlocking portion and the protruding portions to form a hinge.

16. The mounting bracket of claim 15, wherein the opposing faces comprise two opposing square faces and the edge faces comprise rectangular edge faces.

* * * * *